June 28, 1960 F. T. LISS 2,943,192

BROAD BAND LOW CAPACITY MICROWAVE BALANCED MIXER

Filed April 9, 1958

INVENTOR

FABIAN T. LISS

BY W. E. Thibodeau, F. E. McGee, J. P. Edgerton & N. Cass

United States Patent Office 2,943,192
Patented June 28, 1960

2,943,192

BROAD BAND LOW CAPACITY MICROWAVE BALANCED MIXER

Fabian T. Liss, Washington, D.C., assignor to the United States of America as represented by the Secretary of the Army Filed Apr. 9, 1958, Ser. No. 727,504

1 Claim. (Cl. 250—20)

(Granted under Title 35, U.S. Code (1952), sec. 266)

The invention described herein may be manufactured and used by or for the Government for governmental purposes without the payment to me of any royalty thereon.

This invention relates to microwave mixers in general, and more particularly to a broad-band balanced microwave mixer with a low capacity output.

Recently developed microwave short pulse radar systems employ I.-F. amplifiers having very high frequencies of the order of 400 megacycles. For matching microwave components to such very high frequency I.-F. amplifiers, a mixer with a low capacity output is a practical necessity.

Besides having a low capacity output, it is also important that the mixer be balanced so that local oscillator variations will automatically be eliminated. In many applications, size and simplicity of the mixer are additionally important.

Accordingly, it is an object of this invention to provide a simple and compact broad-band balanced microwave mixer having a low capacity output.

In a typical embodiment of a mixer in accordance with the invention, this object is accomplished by means of a waveguide hybrid feeding a fork-like two-arm waveguide structure, within which are matched reverse crystal diodes, one in each arm, arranged so as to provide balanced mixer operation, and connected so as to provide a single low capacity mixer output.

The specific nature of the invention, as well as other objects, uses, and advantages thereof, will clearly appear from the following description and from the accompanying drawing, in which.

Figures 1, 2, 3:
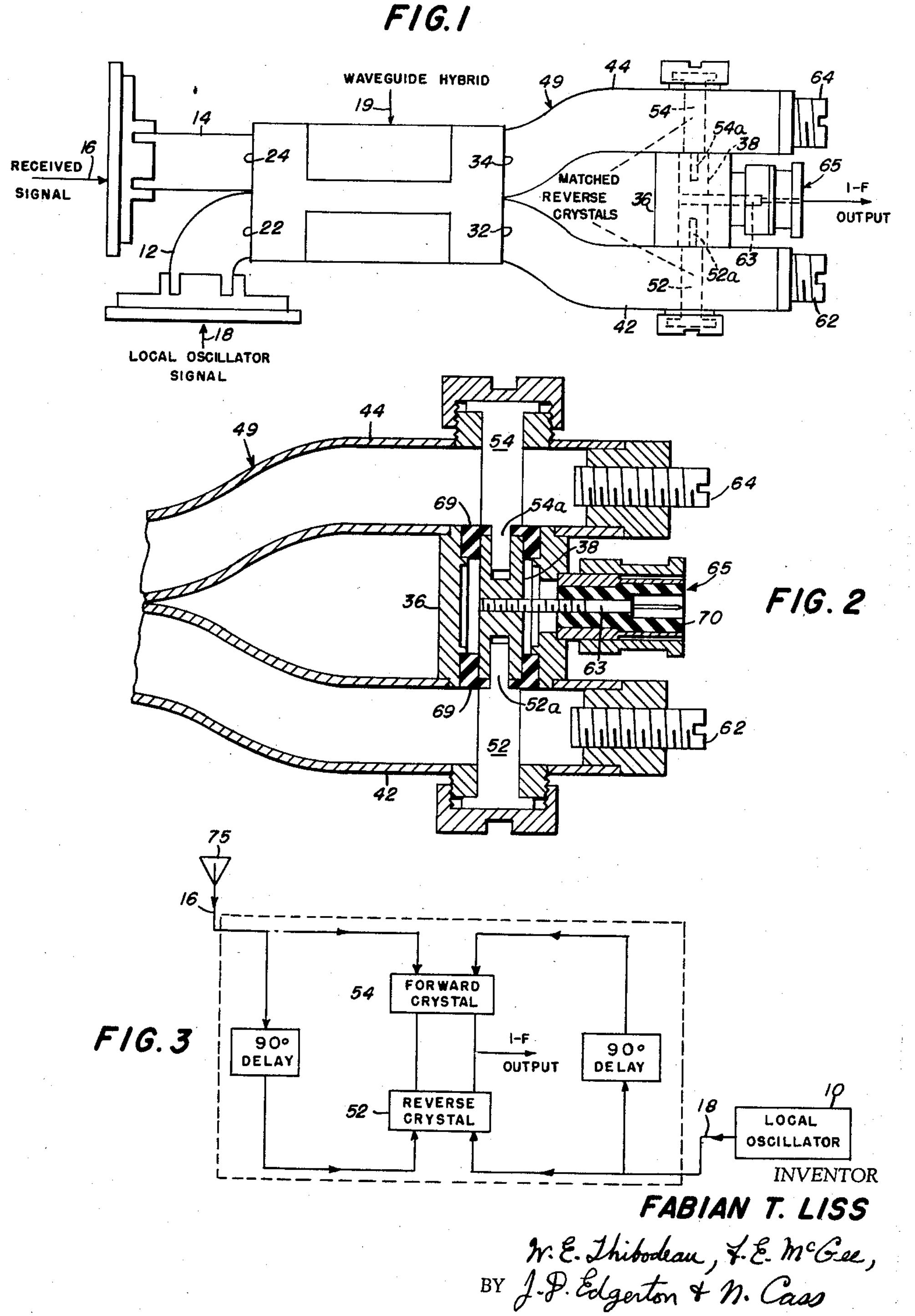
Figure 1 is a longitudinal view of a balanced microwave mixer in accordance with the invention.
Figure 2 is a longitudinal view of the right-half portion of Figure 1.
Figure 3 is a schematic diagram representing the electrical operation of Figure 1.

In Figure 1, a received signal 16 is applied to one input 24 of a topwall waveguide hybrid 19 by means of a first waveguide arm 14. A local oscillator signal 18 is applied to the other input 22 of the waveguide hybrid 19 by means of a second waveguide arm 12. The waveguide hybrid 19 is a commercially available structure which is well known in the art. Such a structure is disclosed in U.S. Patent No. 2,739,288.

The waveguide hybrid 19 has the well known property that energy incident on one of the inputs (22 or 24) will divide evenly between the two outputs 32 and 34, the energy from one output being 90 degrees out of phase with the energy from the other output. (See col. 5, lines 35–40 of Patent No. 2,739,288.)

Thus, in Figure 1, received signal energy 16 incident on the hybrid input 24 divides evenly between the two outputs 32 and 34, the received signal energy at the output 32 lagging the received signal energy at output 34 by 90 degrees. Likewise, the local oscillator signal energy 18 incident on the hybrid input 22 divides evenly between the two outputs 32 and 34, in this case the local oscillator signal energy at the output 34 lagging the local oscillator signal energy at the output 32 by 90 degrees.

The waveguide hybrid 19 feeds a fork-like waveguide structure 49 having waveguide arms 44 and 42 coupled to the hybrid outputs 34 and 32, respectively. Figure 2 is a cross-section view of the fork-like waveguide structure 49.

Within the arms 44 and 42 of the fork-like waveguide structure 49 are disposed matched reverse crystal diodes 54 and 52, respectively. The crystal diode 54, for example, may be forward while the crystal diode 52 may be reversed. In accordance with customary terminology, a forward crystal diode has its cathode connected to the crystal body, and its plate insulated from the body and connected to the crystal output end which protrudes into the waveguide. A reverse crystal diode, on the other hand, has its plate connected to the crystal body and its cathode insulated from the body and connected to the crystal output end which protrudes into the waveguide. Crystal diodes of these types are commercially available, and their mounting in the waveguide arms 44 and 42 as indicated in Figure 2 can be accomplished by well known means. The fork-like arrangement of the arms 44 and 42 permits the crystal diodes 54 and 52 to be mounted with their output ends 54*a* and 52*a*, respectively, directed towards one another, and extending into a hollow cross member 36 which is disposed perpendicularly to arms 44 and 42. A conductive member 38 within the cross member 36 electrically connects the outputs 54*a* and 52*a*. The conductive member 38 is electrically connected to the pin 63 of a conventional output connector 65 such as a BNC connector. Suitable insulating portions 69 and 70 may be provided where needed in the cross member 36 and the connector 65.

The outputs 34 and 32 of the waveguide hybrid 19 are applied to the crystal diodes 54 and 52 by means of waveguide arms 44 and 42, respectively. Because of the phase differences produced by the hybrid 19 between the two halves of received signal energy and the two halves of local oscillator signal energy, it will be understood that if the crystal diodes 52 and 54 were either both forward or both reversed, the difference frequency signal obtained at the output end of one crystal would be 180 degrees out of phase with the difference frequency signal obtained at the output end of the other crystal, so that if connected together by the conductive member 38, the two difference frequency signals would cancel producing no output. However, since one of the crystal diodes is forward and the other reversed, the difference frequency signals produced at the crystal diode output ends will be in phase and add when connected by the conductive member 38 to produce a low capacity single-ended I.-F. output at the connector 65.

Since the overall arrangement is balanced, noise and local oscillator variations will be in phase with one another at the output ends of the crystal diodes so that cancellation results upon addition. Thus, noise or unwanted variations appearing in the I.-F. output will be effectively suppressed permitting a higher signal-to-noise ratio to be achieved.

Screws 64 and 62 in waveguide arms 44 and 42, respectively, may be used for matching and tuning purposes. As is evident from the construction of Figure 1, the mixer is inherently broad-band and will require a minimum of tuning.

Figure 3 is a schematic diagram of the electrical operation of the mixer of Figure 1. This diagram shows how the received signal 16 from an antenna 75, and the local oscillator signal 18 from a local oscillator 10 are both divided into two halves, with one half of each delayed by 90 degrees, and then applied to the forward and reverse crystals 54 and 52 as shown.

In an X-band device constructed in accordance with Figure 1, the output capacity at the connector 65 with the crystal diodes 52 and 54 in place is less than seven micro-microfarads.

It will be apparent that the embodiments shown are only exemplary and that various modifications can be made in construction and arrangement within the scope of the invention as defined in the appended claim.

I claim as my invention:

A broad-band balanced microwave mixer having a low capacity output, said mixer comprising in combination: a waveguide hybrid having first and second inputs and first and second outputs, first means applying a first signal to said first input, second means applying a second signal to said second input, a fork-like waveguide structure having first and second arms coupled to said first and second outputs respectively of said hybrid, a forward crystal diode disposed in said first arm of said structure, a matched reverse crystal diode disposed within said second arm of said structure, a hollow cross member disposed perpendicularly to said first and second arms, the output ends of said diodes being directed towards each other and extending into opposite ends of said cross member, a conductive member within said cross member electrically connecting the outputs of said diodes, and an output connector serving as the mixer output, said conductive member being electrically connected to said connector.

References Cited in the file of this patent

UNITED STATES PATENTS

| | | |
|---|---|---|
| 2,550,409 | Fernsler | Apr. 24, 1951 |
| 2,567,208 | Horvath | Sept. 11, 1951 |
| 2,568,090 | Riblet | Sept. 18, 1951 |
| 2,727,986 | Pascalar | Dec. 20, 1955 |
| 2,754,416 | Hope | July 10, 1956 |
| 2,834,876 | Pritchard | May 13, 1958 |
| 2,850,626 | Tomiysau | Sept. 2, 1958 |

OTHER REFERENCES

Article, "The Short-Slot Hybrid Junction," by Riblet in "Proceedings of the I.R.E." Feb., 1952 pp. 180–184.